United States Patent
Guerreiro

(10) Patent No.: US 10,266,116 B2
(45) Date of Patent: Apr. 23, 2019

(54) METHOD AND DEVICE FOR DISPLAYING A FRONT-VIEW OF A VEHICLE'S SURROUNDING AND RESPECTIVE VEHICLE

(71) Applicant: Continental Automotive GmbH, Hannover (DE)

(72) Inventor: Rui Guerreiro, Hove (GB)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/065,422

(22) PCT Filed: Dec. 7, 2016

(86) PCT No.: PCT/EP2016/080057
§ 371 (c)(1),
(2) Date: Jun. 22, 2018

(87) PCT Pub. No.: WO2017/121544
PCT Pub. Date: Jul. 20, 2017

(65) Prior Publication Data
US 2019/0001887 A1    Jan. 3, 2019

(30) Foreign Application Priority Data
Jan. 12, 2016 (EP) .................... 16150872

(51) Int. Cl.
*B60R 1/00* (2006.01)
*G06T 3/00* (2006.01)
*G06T 3/40* (2006.01)

(52) U.S. Cl.
CPC .............. *B60R 1/00* (2013.01); *G06T 3/0018* (2013.01); *G06T 3/0093* (2013.01);
(Continued)

(58) Field of Classification Search
CPC ............... B60R 1/00; B60R 2300/802; B60R 2300/306; G06T 3/0018; G06T 3/4007;
(Continued)

(56) References Cited

U.S. PATENT DOCUMENTS

| 2008/0136912 A1* | 6/2008 | Iwano | G06T 1/0007 348/148 |
| 2009/0122084 A1* | 5/2009 | Yu | G06T 3/4007 345/660 |

(Continued)

FOREIGN PATENT DOCUMENTS

CN    103247030 A    8/2013

OTHER PUBLICATIONS

International Search Report of the International Searching Authority for International Application PCT/EP2016/080057, dated Mar. 17, 2017, 3 pages, European Patent Office, HV Rijswijk, Netherlands.
(Continued)

*Primary Examiner* — Hoi C Lau
(74) *Attorney, Agent, or Firm* — W. F. Fasse

(57) ABSTRACT

The invention relates to method for displaying a front-view of a vehicle's (42) surrounding, the method comprising the steps of: capturing (S1) camera images (20) of the vehicle's (42) surrounding through a lens (53) of a vehicle camera (44) on an image sensor (52) of said vehicle camera (44); transforming (S2) said captured camera images (20) by a processing unit (101) into display images (30), said display images (30) being substantially projected in parallel onto a projection plane (90) being parallel to an image sensor plane (54) of said image sensor (52); and displaying (S3) said display images (30) on a display device (102) for viewing by a driver of said vehicle (42).

10 Claims, 6 Drawing Sheets

(52) U.S. Cl.
CPC ...... *G06T 3/4007* (2013.01); *B60R 2300/306* (2013.01); *B60R 2300/802* (2013.01)

(58) Field of Classification Search
CPC ......... G06T 3/0093; G06T 3/40; G06T 5/006; H04N 5/23212; G02B 3/0056; G02B 27/2214
See application file for complete search history.

(56) References Cited

U.S. PATENT DOCUMENTS

| | | | | |
|---|---|---|---|---|
| 2010/0260377 | A1* | 10/2010 | Takahashi | G06K 9/00805 382/103 |
| 2011/0304601 | A1* | 12/2011 | Niioka | G02B 27/2214 345/209 |
| 2012/0114262 | A1* | 5/2012 | Yu | G06T 5/006 382/254 |
| 2013/0329120 | A1* | 12/2013 | Hiasa | H04N 5/23212 348/345 |
| 2013/0335618 | A1* | 12/2013 | Sugawara | H04N 5/23212 348/349 |
| 2014/0086494 | A1* | 3/2014 | Benhimane | G06T 3/0093 382/215 |
| 2015/0249782 | A1* | 9/2015 | Fukuda | H04N 5/23212 348/222.1 |
| 2015/0281578 | A1* | 10/2015 | Uekusa | H04N 5/23212 348/220.1 |
| 2016/0119606 | A1* | 4/2016 | Horikawa | G06T 5/003 348/46 |
| 2016/0309074 | A1* | 10/2016 | Ishigami | G02B 3/0056 |
| 2018/0041744 | A1* | 2/2018 | Fukuda | H04N 13/128 |
| 2018/0061034 | A1* | 3/2018 | Zhao | G06T 7/002 |

OTHER PUBLICATIONS

PCT Written Opinion of the International Searching Authority for International Application PCT/EP2016/080057, dated Mar. 17, 2017, 10 pages, European Patent Office, Munich, Germany.
PCT Written Opinion of the International Preliminary Examining Authority for International Application PCT/EP2016/080057, dated Jan. 3, 2018, 7 pages, European Patent Office, Munich, Germany.
PCT International Preliminary Report on Patentability for International Application PCT/EP2016/080057, dated May 17, 2018, 6 pages, European Patent Office, Munich, Germany.
C. Hughes et al., "Wide-Angle Camera Technology for Automotive Applications: a Review", IET Intelligent Transport Systems, vol. 3, No. 1, Mar. 9, 2009, XP006032372, pp. 19 to 31.
Tarak Gandhi et al., "Vehicle Surround Capture: Survey of Techniques and a Novel Omni-Video-Based Approach for Dynamic Panoramic Surround Maps", IEEE Transactions on Intelligent Transportation Systems, vol. 7, No. 3, Sep. 1, 2006, XP002659721, pp. 293 to 308.
Shinji Ozawa, "Image Sensors in Traffic and Vehicle Control", Vehicle Navigation and Information Systems Conference, Aug. 31, 1994, XP010136611, pp. plenary-27 to plenary-34.
Tobias Ehlgen et al., "Maneuvering Aid for Large Vehicle Using Omnidirectional Cameras", WACV'07 IEEE Workshop on Applications of Computer Vision, Jan. 1, 2007, Retrieved from the Internet: URL:http://ieeexplore.ieee.org/stamp/stamp.jsp?arnumber=4118746, XP055289946, 6 pages.

* cited by examiner

METHOD AND DEVICE FOR DISPLAYING A FRONT-VIEW OF A VEHICLE'S SURROUNDING AND RESPECTIVE VEHICLE

The invention relates to a method for displaying a front-view of a vehicle's surrounding, a device for displaying a front-view of a vehicle's surrounding and a vehicle.

Modern autonomous or semi-autonomous driving systems comprise a plurality of vehicle camera which provides a 3D surround view. From the captured data, information about the vehicle's surrounding can be obtained. In particular, in order to facilitate secure driving, a precise recognition of driving lanes or further vehicles is needed.

Cameras with wide-angle or fisheye lenses often provide distorted images which have to be corrected in order to deduce reliable information. From document U.S. Pat. No. 8,718,329 B2, a method of detecting a clear path of travel for a vehicle is known which uses a top-down view technique.

For instance, the motion of vehicles which are crossing in front of the camera is often depicted in a distorted way. Therefore, it is an object of the present invention to provide a display image with reduced distortion effects.

The subject is achieved by a method for displaying a front-view of a vehicle's surrounding as recited in claim 1, a device for displaying a front view of a vehicle's surrounding as recited in claim 6, and a vehicle as recited in claim 11.

According to a first aspect, the invention provides a method for displaying a front-view of a vehicle's surrounding, the method comprising capturing camera images of the vehicle's surrounding through a lens of a vehicle camera on an image sensor of said vehicle camera. Said captured camera images are transformed by a processing unit into display images, said display images being substantially projected in parallel onto a projection plane being parallel to an image sensor plane of said image sensor. Said display images are displayed on a display device for viewing by a driver of said vehicle.

According to a second aspect, the invention provides a device for displaying a front-view of a vehicle's surrounding, comprising a vehicle camera, adapted to capture camera images of the vehicle's surrounding through a lens of said vehicle camera on an image sensor of said vehicle camera. The device further comprises a processing unit, adapted to transform said captured camera images into display images, said display images being substantially projected in parallel onto a projection plane being parallel to an image sensor plane of said image sensor. Further, the device comprises a display device, adapted to display said display images for viewing by a driver of said vehicle.

According to a third aspect, the invention provides a vehicle, comprising a device for displaying a front-view of a vehicle's surrounding.

The invention provides a method and a device which generate display images, wherein two objects having the same size located in a given plane at a distance from the vehicle camera are depicted with the same size in the display image. In other words, the display image depicts objects as if they were projected in parallel onto the image.

In a possible embodiment of the method, transforming said camera images comprises the following steps: defining a virtual plane at a predetermined distance from the vehicle camera; dividing the virtual plane into a plurality of virtual pixels; computing the projection of each virtual pixel onto the camera image through the lens, the camera image comprising a plurality of camera pixels; and generating the display image with a plurality of display pixels corresponding to the plurality of virtual pixels, wherein each display pixel is generated based on the camera pixels lying in a vicinity of the projection of the respective virtual pixel. The method allows to transform the captured camera image into a display image which appears to be projected in parallel onto the projection plane.

In a possible embodiment of the method, generating each display pixel comprises averaging and/or filtering over the camera pixels lying in the vicinity of the projection of the respective virtual pixel. In particular, in central regions of the camera images, due to distortion effects, the camera images comprise more details than the display images. Therefore, in order to generate the respective pixel of the display image, an averaging process and/or filtering process over the camera pixels is performed in order to downscale the camera image.

In a possible embodiment of the method, generating each display pixel comprises interpolating over camera pixels lying in the vicinity of the projection of the image of the respective virtual pixel. In particular, in the marginal areas of the camera images, the image appears compressed. As the display image comprises more information and a higher pixel density in the marginal areas than the original camera image, the camera pixels are interpolated in order to upscale the camera image.

In a possible embodiment of the method, at least one further object is detected in the vehicle's surrounding, wherein a velocity of the at least one further object is determined based on a motion of the object in the camera images. As the ratio of distances and sizes is preserved in the display image, the determination of the velocity of the object can easily be performed.

In a possible embodiment of the device, the microprocessor is further adapted to define a virtual plane at a predetermined distance from the vehicle camera, to divide the virtual plane into a plurality of virtual pixels and to compute the projection of each virtual pixel onto the camera image through the lens of the vehicle camera, the camera image comprising a plurality of camera pixels. The microprocessor is adapted to generate the display image with a plurality of display pixels corresponding to the plurality of virtual pixels, wherein each display pixel is generated based on the camera pixels lying in a vicinity of the projection of the respective virtual pixel.

In a possible embodiment of the device, the microprocessor is further adapted to generate each display pixel by averaging and/or filtering over the camera pixels lying in the vicinity of the projection of the respective virtual pixel.

In a possible embodiment of the device, the microprocessor is further adapted to generate each display pixel by interpolating over camera pixels lying in the vicinity of the projection of the respective virtual pixel.

In a possible embodiment the device further comprises a detection device adapted to detect at least one further object in the vehicle's surrounding. The microprocessor is further adapted to determine a velocity of the at least one further object based on a motion of the object in the display images.

In the following, possible embodiments of the different aspects of the present invention are described with reference to the enclosed figures in more detail.

Figure 1:
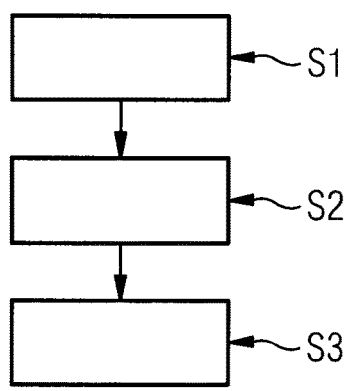
FIG. 1 shows a flowchart of a method for displaying a front-view of a vehicle's surrounding according to an embodiment.

FIG. 1 shows a flowchart of a method for displaying a front-view of a vehicle's surrounding. The vehicle comprises at least one vehicle camera. In step S1, camera images 20 of the vehicle's surrounding are captured through a lens of the vehicle camera on an image sensor of said vehicle camera. The lens can be a wide-angle lens or a fisheye lens with an angle of view of more than 180 degrees.

Figure 2:
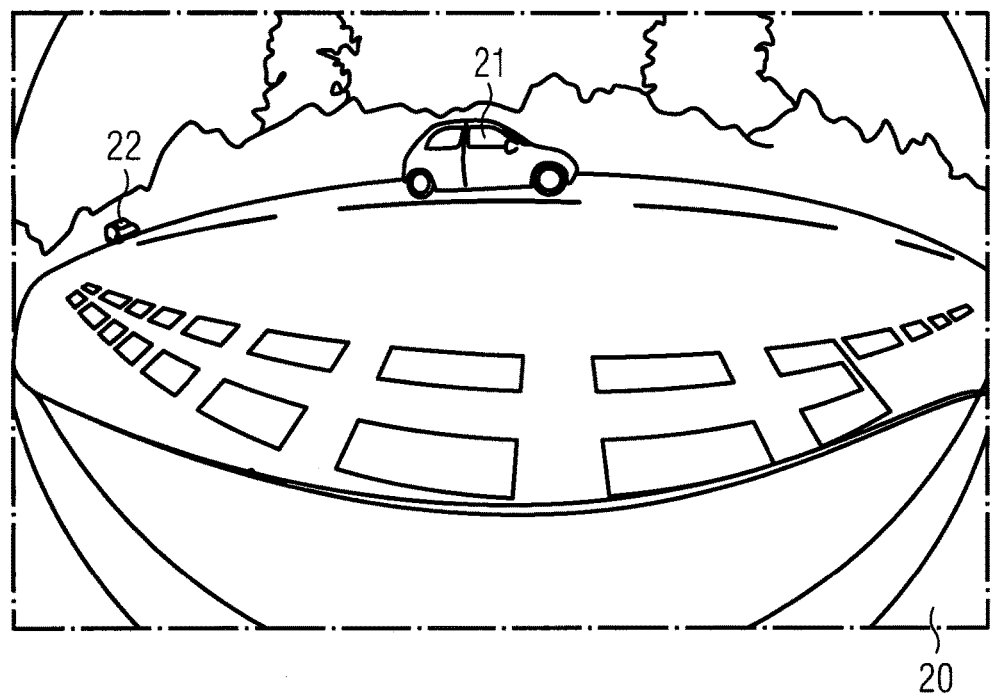
FIG. 2 shows an exemplary camera image according to an embodiment.

An exemplary camera image 20 is depicted in FIG. 2. The camera image 20 is distorted, i.e., a central area of the camera image 20, showing a first vehicle 21, is stretched, whereas a margin area of the camera image 20, showing a second vehicle 22, is compressed.

Figure 3:
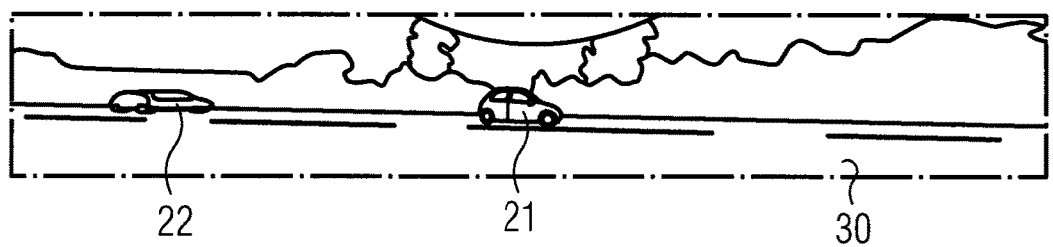
FIG. 3 shows an exemplary display image according to an embodiment.

In a second step S2, said captured camera images 20 are transformed into an exemplary display image 30 corresponding to the camera image 20 of FIG. 2, as depicted in FIG. 3. The display image 30 is projected in parallel onto a projection plane, which is parallel to an image sensor plane of said image sensor. In other words, apart from information which the original camera image 20 does not contain, the display image 30 appears as if it were projected in parallel on an image sensor which is of the same size as the depicted scene.

In a third step S3, said display images 30 are displayed on a display device for viewing by a driver of said vehicle.

An exemplary embodiment of the transformation of said camera images into display images is described in the following.

Figure 4:
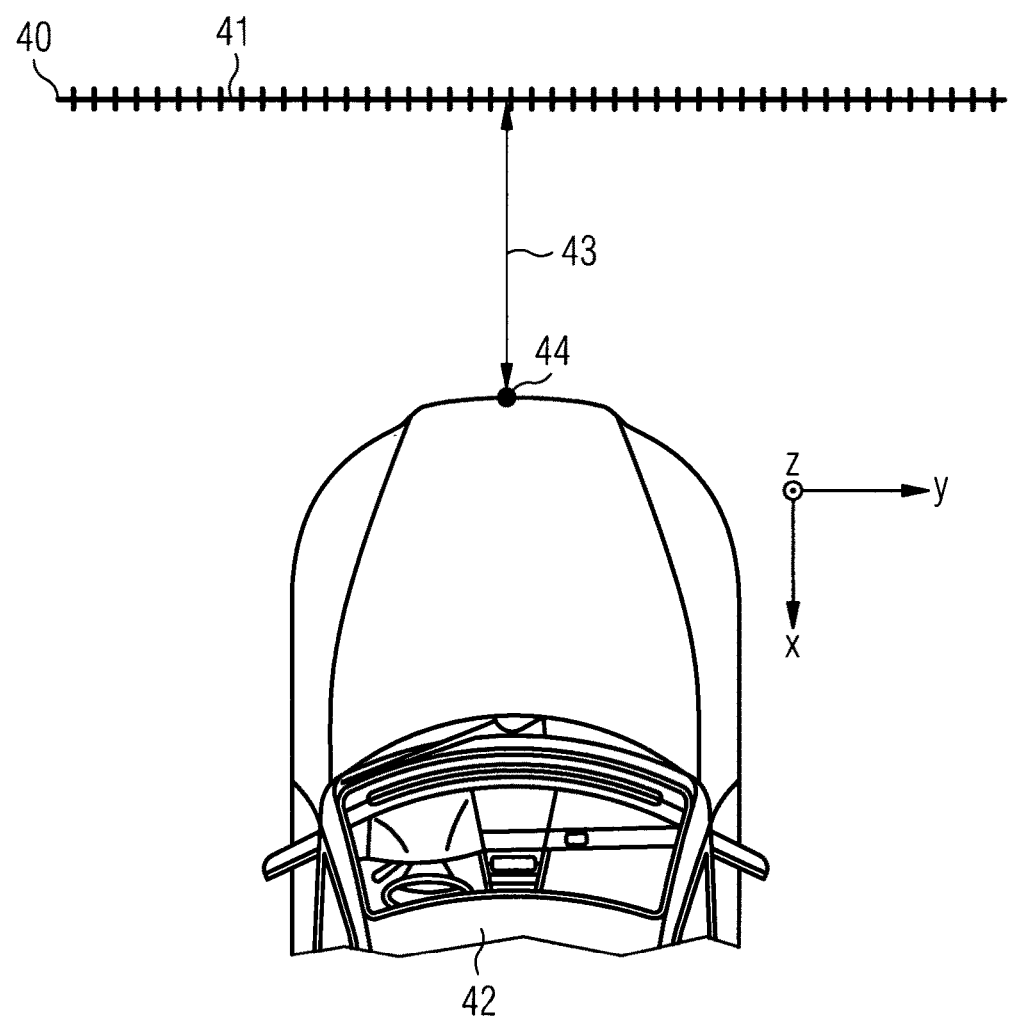
FIG. 4 shows a schematic illustration of a virtual plane at a distance from a vehicle according to an embodiment.

In FIG. 4, the vehicle 42 with the vehicle camera 44 at a front end of the vehicle 42 is depicted. The vehicle camera 44 is illustrated in more detail in FIG. 5.

The vehicle camera 44 comprises a lens 53 and an image sensor 52. The image sensor 52 lies in an image sensor plane 54 which corresponds with a y-z-plane. Along the x-axis, in a predetermined distance 43, for instance a value between 2 to 10 m, a virtual plane 40 is defined. The virtual plane 40 is further divided into a plurality of virtual pixels 41. For each virtual pixel 41, the corresponding projection 51 of the virtual pixel 41 through the lens 53 onto the image sensor 52 is computed. The image sensor 52 is identified with the camera image 20 such that the projection 51 of the virtual pixel 41 on the camera image 20 is obtained. The camera image 20 comprises a plurality of camera pixels.

Figure 6:
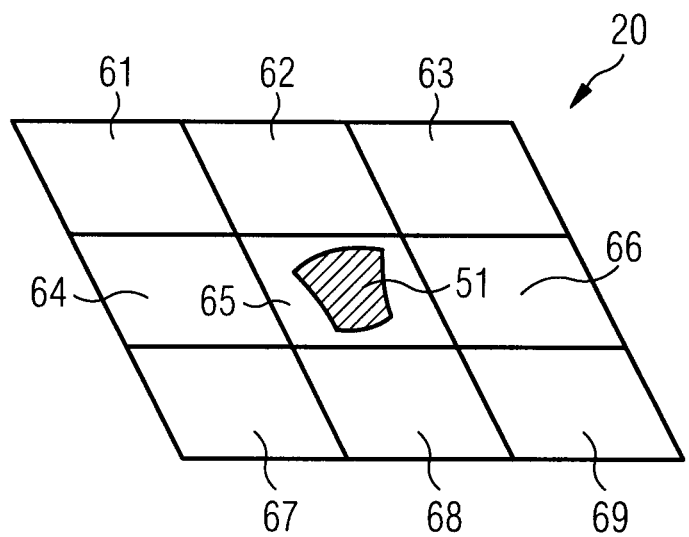
FIGS. 6, 7 show schematic illustrations of projections of virtual pixels onto the camera image according to an embodiment.

In an exemplary scenario as illustrated in FIG. 6, the projection 51 of the virtual pixel 41 lies within a single camera pixel 65 surrounded by further camera pixels 61 to 64 and 66 to 69. The scenario as depicted in FIG. 6 appears in particular for virtual pixels 41 which lie in margin areas of the virtual plane 40.

Figure 7:
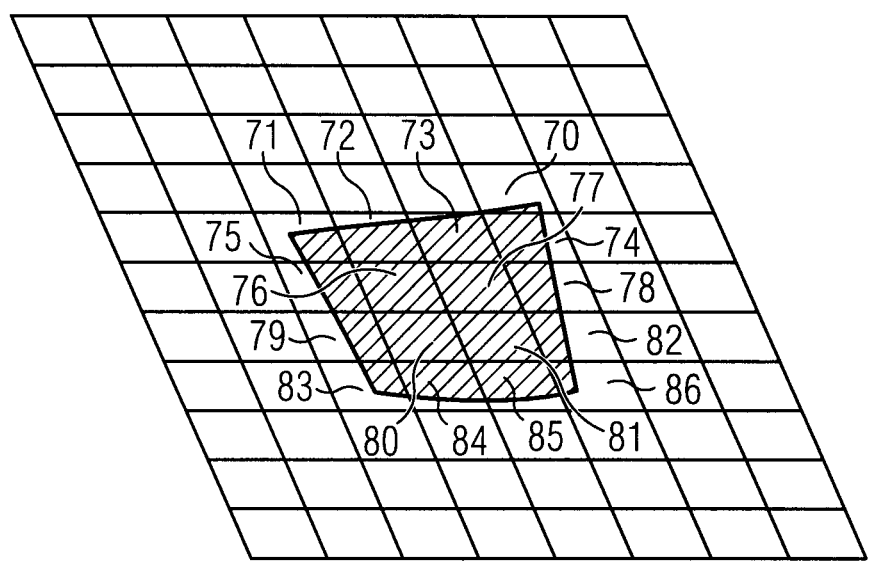

In FIG. 7, an alternative possible scenario is illustrated, where the projection 51 of the virtual pixel 41 extends over a plurality of camera pixels 71 to 86. Such a scenario appears in particular for pixels close to the center of the virtual plane 40.

Next, the display image 30 is generated, wherein the display image 30 comprises a plurality of display pixels 31. To each virtual pixel 41, a single display pixel 31 is assigned. In particular, the number and location of display pixels 31 corresponds to the number and location or the corresponding virtual pixels 41.

Figure 8:
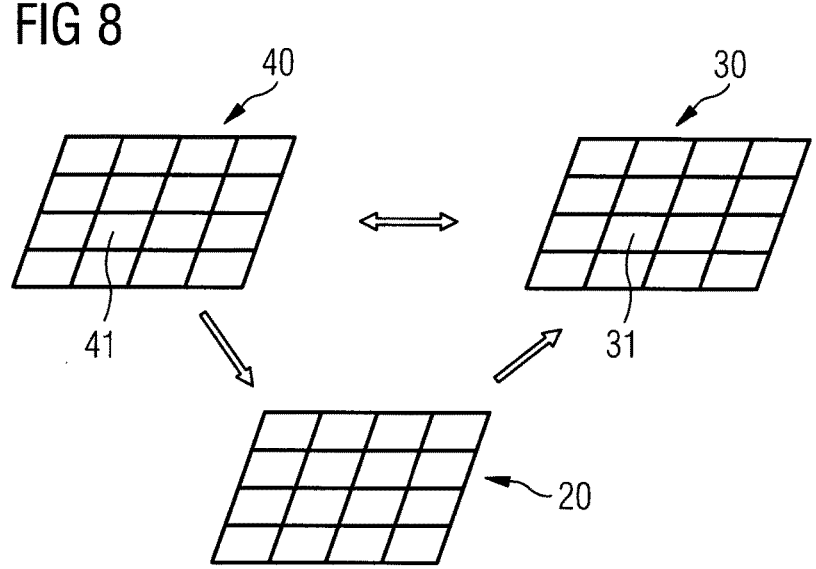
FIG. 8 shows the relation between the virtual plane, the camera image and the display image according to an embodiment.

In FIG. 8, the correspondence between the virtual plane 40, the camera image 20 and the display image 30 is illustrated. Each display pixel 31 corresponding to the associated virtual pixel 41 is generated based on the camera pixels 61 to 86 lying in a vicinity of the projection 51 of the respective virtual pixel 41. If the projection 51 of the virtual pixel 41 matches exactly one single camera pixel, the corresponding display pixel 31 is given the value of this single camera pixel.

According to a further embodiment, in a situation as illustrated in FIG. 6, where the projection 51 of the virtual pixel 41 lies within a single camera pixel 65, the generation of the display pixel 31 corresponding to the virtual pixel 41 comprises interpolating over the camera pixels 61 to 69 lying in the vicinity of the projection 51 of the respective virtual pixel 41. The vicinity can comprise all pixels with a common boundary with the camera pixel 65. Interpolating can comprise bilinear interpolation or cubic b-spline interpolation or any other interpolation method.

According to a further embodiment, if the protection 51 of a virtual pixel 41 extends over a plurality of camera pixels 71 to 86, as depicted in FIG. 7, the generation of a display pixel comprises averaging and/or filtering over the camera pixels 71 to 86 lying in the vicinity of the protection 51 of the respective virtual pixel 41. For instance, the values of each of the camera pixels 71 to 86 can be added and divided by the total number of pixels 71 to 86 in order to generate a value for the display pixel 31 corresponding to the virtual pixel 41.

By computing the relation between each display pixel 31 and the corresponding camera pixels, a mapping function can be defined and stored. For each new camera image, the transformation of the camera image into the display image can be performed using the mapping function.

Figure 9:
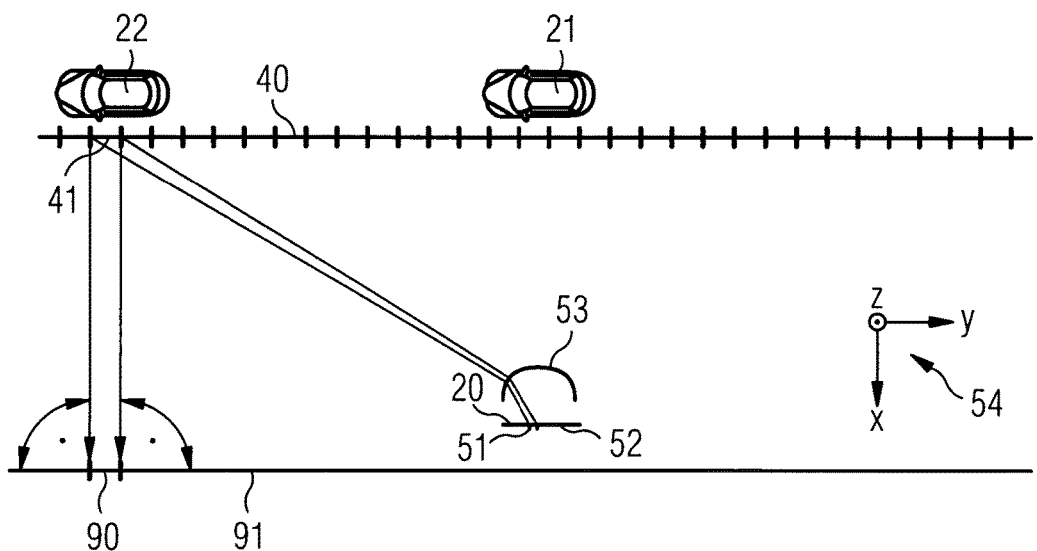
FIG. 9 shows a schematic illustration of a projection plane according to an embodiment.

As illustrated in FIG. 9, a display image 30, as shown in FIG. 3, corresponds essentially to an image being projected in parallel onto a projection plane 91 being parallel to the image sensor plane 54. A virtual pixel 41 of the virtual plane 40 is substantially projected in parallel onto a projected pixel 90 on the projection plane 91. The first vehicle 21 and the second vehicle 22, being of the same size, for instance corresponding to three virtual pixels 41 in the virtual plane 40, are projected onto images of the first and second vehicle 21 and 22 on the display image 30, which are again of the same size.

Figure 10:
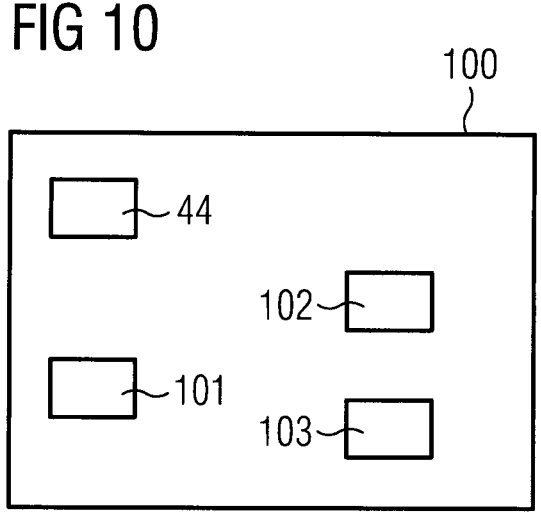
FIG. 10 shows a block diagram of a device for displaying a front-view of a vehicle's surrounding according to an embodiment.

In FIG. 10, a block diagram of a device 100 for displaying a front view of a vehicle's 42 surrounding is illustrated. The device 100 comprises a vehicle camera 44, which is adapted to capture camera images 20 of the vehicles 42 surrounding through a lens 53 of said vehicle camera 44 onto an image sensor 42 of said vehicle 44. Further, the device 100 comprises a processing unit 101 which is adapted to transform the captured camera images 20 into display images 30. The display images 30 are projected in parallel onto a projection plane 91, as depicted in FIG. 9, the projection plane 91 being parallel to an image sensor plane 54 of said image sensor 52. Further, the device 100 comprises a display device 102 which is located in an interior of the vehicle 42, which is adapted to display the display images 30 for viewing by a driver of the vehicle 42.

Figure 5:
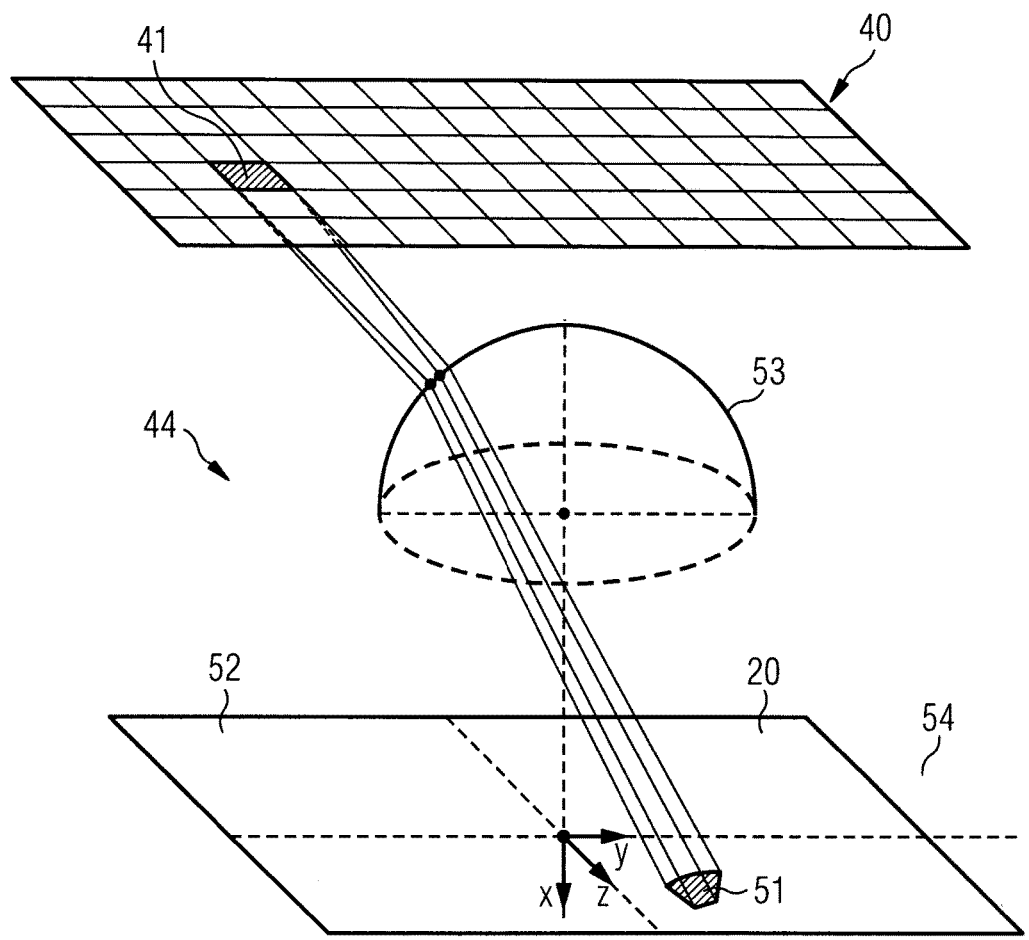
FIG. 5 shows a schematic illustration of a vehicle camera according to an embodiment.

According to a further embodiment, the microprocessor 101 is further adapted to define a virtual plane 40 at a predetermined distance 43 from the vehicle camera 44. Further, the microprocessor 101 is adapted to divide the virtual plane 40 into a plurality of virtual pixels 41, as shown in FIGS. 4 and 5. Further, the microprocessor is adapted to compute the projection 51 of each virtual pixel 41 on the camera image 20 through the lens 53 of the vehicle camera 44. The camera image 20 comprises a plurality of camera pixels 61 to 86, as shown in FIGS. 6 and 7. Further, the microprocessor is adapted to generate the display image 30 comprising a plurality of display pixels 31 corresponding to the plurality of virtual pixels 41, wherein each display pixel 31 is generated based on the camera pixels 61 to 86 lying in a vicinity of the projection 51 of the respective virtual pixel 41.

According to a further embodiment, a microprocessor 101 is adapted to generate each display pixel 31 by averaging and/or filtering over the camera pixels 61 to 86 which lie in the vicinity of the projection 51 of the image of the respective virtual pixel 41.

According to yet another embodiment, the microprocessor 101 is adapted to generate each display pixel 31 by interpolating over camera pixels 61 to 86 lying in the vicinity of the projection 51 of the image of the respective virtual pixel 41.

According to another embodiment, the device 10 comprises further a detection device 103 which is adapted to detect at least one further object, such as the first and second vehicles 21 and 22 in a vehicle's 42 surrounding. The microprocessor 101 is further adapted to determine the velocity of the at least one further object 21 and 22 based on a motion of the object 21, 22 in the display images 30. Because the ratio of length is preserved, as shown in FIG. 9, the velocity of the first or second vehicle 21 and 22 can be simply computed by computing the respective velocity within the display image 30.

Figure 11:
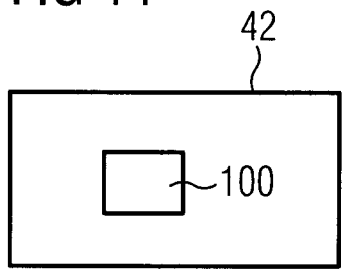
FIG. 11 shows a block diagram of a vehicle according to an embodiment.

FIG. 11 shows a block diagram of a vehicle 42 comprising a device 100 displaying a front-view of vehicle's 42 surrounding. The device 100 corresponds preferably to one of the above described embodiments.

The invention claimed is:

1. A method for displaying a front-view of a vehicle's (42) surrounding, the method comprising the steps of:
    capturing (S1) camera images (20) of the vehicle's (42) surrounding through a lens (53) of a vehicle camera (44) on an image sensor (52) of said vehicle camera (44), said camera images (20) comprising a plurality of camera pixels (61-86);
    transforming (S2) said captured camera images (20) by a processing unit (101) into display images (30) corresponding to images being projected in parallel onto a projection plane (91) being parallel to an image sensor plane (54) of said image sensor (52), wherein a virtual plane (40) being divided into a plurality of virtual pixels (41) is defined at a predetermined distance (43) from the vehicle camera (44), wherein the projection (51) of each virtual pixel (41) onto the camera image (20) through the lens (53) is computed, and wherein the display image (30) is generated, the display image (30) having a plurality of display pixels (31), each display pixel (31) being associated with a corresponding virtual pixel (41), and wherein each display pixel (31) is generated by interpolating and/or averaging and/or filtering over the camera pixels (61-86) lying in a vicinity of the projection (51) of the associated virtual pixel (41); and
    displaying (S3) said display images (30) on a display device (102) for viewing by a driver of said vehicle (42).

2. The method according to claim 1, wherein each display pixel (31) is generated by the averaging and/or the filtering over the camera pixels lying in the vicinity of the projection (51) of the associated virtual pixel (41).

3. The method according to claim 1, wherein each display pixel (31) is generated by the interpolating over the camera pixels (61-86) lying in the vicinity of the projection (51) of the associated virtual pixel (41).

4. A device (100) for displaying a front-view of a vehicle's (42) surrounding, comprising:
    a vehicle camera (44), adapted to capture camera images (20) of the vehicle's (42) surrounding through a lens (53) of said vehicle camera (44) on an image sensor (52) of said vehicle camera (44), said camera images (20) comprising a plurality of camera pixels (61-86);
    a processing unit (101), adapted to transform said captured camera images (20) into display images (30) corresponding to images being projected in parallel onto a projection plane (91) being parallel to an image sensor plane (54) of said image sensor (52), wherein the processing unit (101) is adapted to define a virtual plane (40) being divided into a plurality of virtual pixels (41) at a predetermined distance (43) from the vehicle camera (44), to compute the projection (51) of each virtual pixel (41) onto the camera image (20) through the lens (53), and to generate the display image (30), the display image (30) having a plurality of display pixels (31), each display pixel (31) being associated with a corresponding virtual pixel (41), and wherein the processing unit (101) is adapted to generate each display pixel (31) by interpolating and/or averaging and/or filtering over the camera pixels (61-86) lying in a vicinity of the projection (51) of the associated virtual pixel (41); and
    a display device (102), adapted to display said display images (30) for viewing by a driver of said vehicle (42).

5. The device (100) according to claim 4, wherein the processing unit is adapted to generate each display pixel (31) by the averaging and/or the filtering over the camera pixels (61-86) lying in the vicinity of the projection (51) of the associated virtual pixel (41).

6. The device (100) according to claim 4, wherein the processing unit is adapted to generate each display pixel (31) by the interpolating over the camera pixels (61-86) lying in the vicinity of the projection (51) of the associated virtual pixel (41).

7. A vehicle (42), comprising the device according to claim 4, in combination with a vehicle body.

8. The method according to claim 1, wherein the number and location of display pixels (31) correspond to the number and location of the associated virtual pixels (41).

9. The method according to claim 3, wherein the interpolating over the camera pixels (61-86) comprises bilinear interpolation or cubic b-spline interpolation.

10. The method according to claim 1, wherein the camera pixels (61-86) lying in the vicinity of the projection (51) of the associated virtual pixel (41) comprise all pixels having a common boundary with the camera pixels (61) comprising the projection (51).

* * * * *